US012728481B2

(12) United States Patent
Nagano et al.

(10) Patent No.: US 12,728,481 B2
(45) Date of Patent: Sep. 8, 2026

(54) OPTICAL COMPONENT MANUFACTURING METHOD, AND OPTICAL COMPONENT

(71) Applicant: SUMITOMO ELECTRIC INDUSTRIES, LTD., Osaka (JP)

(72) Inventors: Shigehiro Nagano, Osaka (JP); Manabu Shiozaki, Osaka (JP); Hajime Arao, Osaka (JP); Tetsuya Nakanishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 177 days.

(21) Appl. No.: 18/707,631

(22) PCT Filed: Sep. 22, 2022

(86) PCT No.: PCT/JP2022/035509

§ 371 (c)(1),
(2) Date: May 6, 2024

(87) PCT Pub. No.: WO2023/095432

PCT Pub. Date: Jun. 1, 2023

(65) Prior Publication Data

US 2026/0077428 A1 Mar. 19, 2026

(30) Foreign Application Priority Data

Nov. 24, 2021 (JP) ................................ 2021-190291

(51) Int. Cl.
*B23K 26/0622* (2014.01)
*B23K 26/064* (2014.01)
(Continued)

(52) U.S. Cl.
CPC ...... *B23K 26/0624* (2015.10); *B23K 26/0648* (2013.01); *B23K 26/082* (2015.10);
(Continued)

(58) Field of Classification Search
CPC .. B23K 26/0624; B23K 26/082; B23K 26/53; B23K 26/60; B23K 26/0648; B23K 2103/54; G02B 6/10
See application file for complete search history.

(56) References Cited

U.S. PATENT DOCUMENTS

2001/0021293 A1 9/2001 Kouta et al.
2004/0094527 A1 5/2004 Bourne et al.
(Continued)

FOREIGN PATENT DOCUMENTS

JP H10-332971 A 12/1998
JP 2000-305039 A 11/2000
(Continued)

OTHER PUBLICATIONS

Neil Troy, Christopher W. Smelser, and Denise M. Krol, “Role of hydrogen loading and glass composition on the defects generated by the femtosecond laser writing process of fiber Bragg gratings,” Opt. Mater. Express 2, 1663-1670 (2012) (Year: 2012).*
(Continued)

*Primary Examiner* — JaMel M Nelson
*Assistant Examiner* — Erica Hartsell Funk
(74) *Attorney, Agent, or Firm* — Oliff PLC

(57) ABSTRACT

A manufacturing method, etc. facilitating control of the waveguide’s width and thickness in an optical component, the method including preparing a glass member, irradiating femtosecond laser light, and moving a laser light condensed point. The laser light has an energy amount causing the glass member’s refractive-index-change and a flat-top-shaped intensity distribution. The beam-irradiation region is defined by a region having an area of $1/e^2$ or more of the maximum intensity. The flat-top region is defined by a contour of a region of ½ or more of the maximum intensity and has an area of 0.45 times or more that of the beam-irradiation
(Continued)

region. An angle between the beam-irradiation region and the scanning-direction is from 70° to 110°, and an angle between an orthogonal plane to the glass member's thickness direction and the scanning-direction is 20° or less.

5 Claims, 9 Drawing Sheets

(51) Int. Cl.

*B23K 26/082* (2014.01)
*B23K 26/53* (2014.01)
*B23K 26/60* (2014.01)
*G02B 6/10* (2006.01)
*B23K 103/00* (2006.01)

(52) U.S. Cl.

CPC .............. *B23K 26/53* (2015.10); *B23K 26/60* (2015.10); *G02B 6/10* (2013.01); *B23K 2103/54* (2018.08)

(56) References Cited

U.S. PATENT DOCUMENTS

| | | | |
|---|---|---|---|
| 2012/0039560 | A1 | 2/2012 | Mazur et al. |
| 2020/0324376 | A1 | 10/2020 | Nagano et al. |

FOREIGN PATENT DOCUMENTS

| | | | | |
|---|---|---|---|---|
| JP | 2001-311847 | A | | 11/2001 |
| JP | 2003-255262 | A | | 9/2003 |
| JP | 2003279758 | A | * | 10/2003 |
| JP | 2005-205464 | A | | 8/2005 |
| JP | 2005205464 | | * | 8/2005 |
| JP | 2007-079161 | A | | 3/2007 |
| WO | 2019/138821 | A1 | | 7/2019 |

OTHER PUBLICATIONS

Matsuura Translation accessed on Espacenet Dec. 27, 2025 JP-2003279758-A (Year: 2003).*

Takeshima Translation accessed on Espacenet Dec. 27, 2025 JP2005205464 (Year: 2005).*

Sakakura et al.; "Improved phase hologram design for generating symmetric light spots and its application for laser writing of waveguides;" Optics Letters; 2011; pp. 1065-1067; vol. 36, No. 7.

Fuerbach et al.; Fabrication of Novel Integrated Components for Next-Generation Optical Networks Using the Femtosecond-Laser Direct-Write Technique; ICTON 2014; 2014; pp. 1-4.

Nasu et al.; "Low-loss waveguides written with a femtosecond laser for flexible interconnection in a planar light-wave circuit;" Optics Letters; 2005; pp. 723-725; vol. 30, No. 7.

Kenji Fuse et al.; "Beam Shaping for Advanced Laser Materials Processing;" Laser Technik Journal; 2015; pp. 19-22.

Glezer et al.; "Ultrafast-laser driven micro-explosions in transparent materials;" Appl. Phys. Lett .; 1997; pp. 882-884; vol. 71, No. 7.

Liu et al.; "Micromodification of element distribution in glass using femtosecond laser irradiation;" Optics Letters; 2009; pp. 136-138; vol. 34, No. 2.

Shimotsuma et al.; "Self-organized nanogratings in glass irradiated by ultrashort light pulses;" Physical Review Letters; 2003; pp. 247405-1-247405-4; vol. 91, No. 24.

* cited by examiner

*Fig.3*

| | BEAM SHAPING OPTICAL SYSTEM | BEAM SPOT SHAPE |
|---|---|---|
| ASPHERICAL LENS | LASER LIGHT<br>111<br>110<br>BW | 350<br>$Y_d$<br>$Z_d$ |
| CONDENSER LENS + CYLINDRICAL LENS | LASER LIGHT<br>121<br>122<br>BW | 350<br>$Y_d$<br>$Z_d$ |

CROSS-SECTIONAL STRUCTURE (COMPARATIVE EXAMPLE)
NUMBER OF SCANS: 13 TIMES
10
LL
15
X
RP
Z
Y
NUMBER OF SCANS: 29 TIMES
10
LL
15
X
RP
Z
Y
NUMBER OF SCANS: 57 TIMES
10
LL
15
X
RP
Z
Y

OPTICAL COMPONENT MANUFACTURING METHOD, AND OPTICAL COMPONENT

TECHNICAL FIELD

The present disclosure relates an optical component manufacturing method and an optical component.

This application claims priority from Japanese Patent Application No. 2021-190291 filed on Nov. 24, 2021, which is based on the contents of which are incorporated herein by reference in their entirety.

BACKGROUND ART

As an optical component manufacturing method for providing an optical waveguide in a glass member, Non-Patent Document 1 discloses a manufacturing method for simultaneously forming three optical waveguides optically independent to each other in a glass member by multi-point irradiation using a hologram optical element. Non-Patent Document 2 discloses a manufacturing method for forming an optical waveguide (core) having a nearly circular cross-section in a laser condensed region within a glass member by thermal storage effect of laser light having a high repetition frequency of 5 MHz. Non-Patent Document 3 also discloses a manufacturing method for forming an optical waveguide having a square-shaped cross-section within a glass member by irradiating laser light multiple times while shifting the laser irradiation position in a width direction of the optical waveguide. Furthermore, Non-Patent Document 4 discloses a beam shaping technology using a diffractive optical element (hereinafter referred to as "DOE (Diffractive Optical Element)") or an aspheric lens.

The refractive index increasing mechanism by laser irradiation using, for example, femtosecond laser light as laser light is disclosed in the following Non-Patent Document 5, Non-Patent Document 6, and Non-Patent Document 7.

CITATION LIST

Non-Patent Literatures

Non-Patent Document 1: S. Masaaki, et al., "Improved phase hologram design for generating symmetric light spots and its application for laser writing of waveguides," OPTICS LETTERS, Vol. 36, No. 7, Apr. 1, 2011, pp. 1065-1067.

Non-Patent Document 2: A. Fuerbach, et al., "Fabrication of Novel Integrated Components for Next-Generation Optical Networks Using the Femtosecond-Laser Direct-Write Technique," ICTON2014, We.A2.2.

Non-Patent Document 3: Y. Nasu, et al., "Low-loss waveguides written with a femtosecond laser for flexible interconnection in a planar light-wave circuit", Optics Letters, Vol. 30, pp. 723-725 (2005).

Non-Patent Document 4: Keiji Fuse, "Beam Shaping for Advanced Laser Materials Processing," Laser Technik Journal, pp. 19-22 (2015).

Non-Patent Document 5: E. N. Glezer and E. Mazur, "Ultrafast-laser driven micro-explosions in transparent materials," Appl. Phys. Lett. Vol. 71, No. 7, pp. 882-884 (1997).

Non-Patent Document 6: Y. Liu, et al., "Micromodification of element distribution in glass using femtosecond laser irradiation," OPTICS LETTERS, Vol. 34, No. 2, pp. 136-138 (2009).

Non-Patent Document 7: Y. Shimotsuma, et al., "Self-organized nanogratings in glass irradiated by ultrashort light pulses," PHYSICAL REVIEW LETTERS, Vol. 91, No. 24, pp 247405-1 to 247405-4 (2003).

SUMMARY OF INVENTION

An optical component manufacturing method of the present disclosure comprises preparation, laser irradiation, and condensed point movement. In the preparation, a glass member is prepared in which a continuous refractive index changing region is to be provided. In the laser irradiation, femtosecond laser light is irradiated onto the glass member so that it is condensed within the glass member. In the condensed point movement, a position of a condensed point is moved relative to the glass member along a scanning direction. The irradiated femtosecond laser light has the amount of energy to cause a light-induced refractive index change in the glass member. A light intensity distribution on a plane including the condensed point of the femtosecond laser light and orthogonal to a thickness direction of the glass member has a flat-top region. A beam irradiation region on the plane including the condensed point and orthogonal to the thickness direction of the glass member is a beam spot of the femtosecond laser light. The beam irradiation region is a single continuous region defined by the contour of a region where a light intensity is $1/e^2$ or more of a maximum light intensity. The flat-top region is a region of ½ or more of the maximum light intensity and has an area of 0.45 times or more that of the beam irradiation region. Furthermore, an angle between a direction in which a width of the beam irradiation region is widest and the scanning direction is 70° or more and 110° or less, and an angle between the plane orthogonal to the thickness direction of the glass member and the scanning direction is 20° or less.

BRIEF DESCRIPTION OF DRAWINGS

FIG. 3 is a diagram for explaining various beam shaping optical systems and beam spot shapes.

DESCRIPTION OF EMBODIMENTS

Problems to be Solved by Invention

Figure 1:
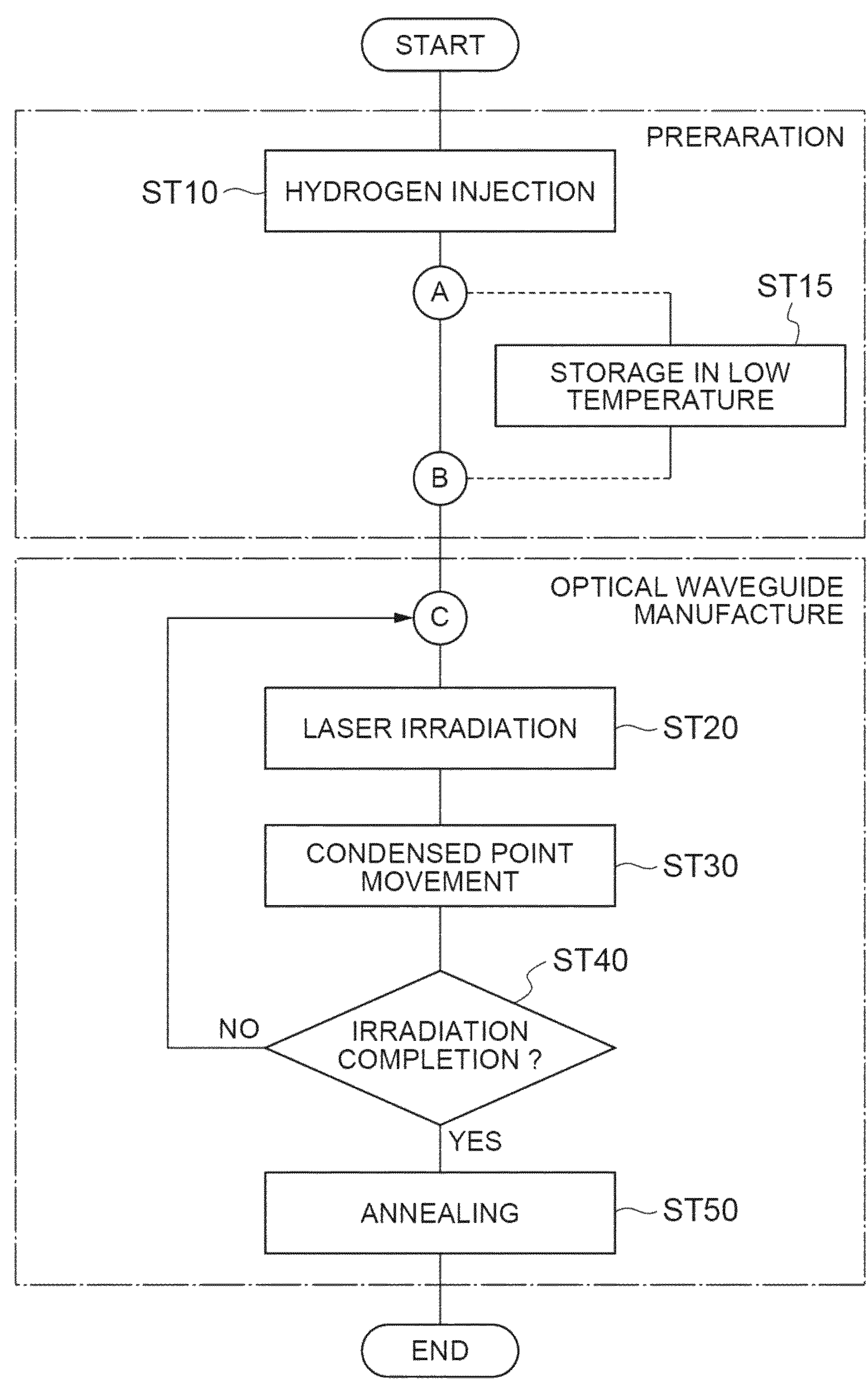
FIG. 1 is a flowchart for explaining the optical component manufacturing method according to the present disclosure.

As a result of studying the above-described related art, the inventors have found the following problems. That is, in the manufacturing method of Non-Patent Document 1, three diffracted light beams generated by the holographic optical element are assigned respectively to the optical waveguides to be formed. However, in the manufacturing method of Non-Patent Document 1, the thickness of each optical waveguide to be formed (cross-sectional length of the optical waveguide along the thickness direction of the glass member) and the width of each optical waveguide are not controlled.

The manufacturing method of Non-Patent Document 2 realizes thermal diffusion exceeding the length of the modified region along the thickness direction of the glass member (thickness of the optical waveguide) by heating a predetermined position in the glass member by irradiating laser light having an increased repetition frequency. By this, an optical waveguide (core) with a nearly circular cross-sectional shape is realized within the glass member (increasing the width of the optical waveguide width). However, in the control of the amount of the refractive index change in the glass member and the size of the cross-section of the optical waveguide (core diameter), it is difficult to handle them as independent parameters compared to Non-Patent Document 3, and therefore there is such a problem that the precise control of the width of the optical waveguide is difficult.

The manufacturing method of Non-Patent Document 3 performs the width control to the optical waveguide provided in the glass member by irradiating the laser light several times, e.g. 20 times, while shifting the laser irradiation position in the width direction of the optical waveguide (multi-scanning). Therefore, the manufacturing method of Non-Patent Document 3 has the problem that the manufacturing time is significantly longer than in the case of an optical waveguide formed by a single laser scanning.

Furthermore, Non-Patent Document 4 proposes beam shaping which is realized by an optical system including an aspherical lens, an optical system combining a condenser lens and a cylindrical lens, and so on. However, in the case that the laser shaping technology disclosed in Non-Patent Document 4 is simply applied, a reduction in the power density of the laser light to be irradiated onto the glass member is unavoidable, and as a result, there is such a problem that the amount of the energy required for modification within the glass member may not be obtained.

The present disclosure has been made to solve the above-described problems, and an object of the present disclosure is to provide an optical component manufacturing method and an optical component, facilitating the control of the width and thickness of the optical waveguide in the optical component and enabling the manufacture of an optical waveguide having such a structure so as to effectively suppress propagation loss.

Effects of Invention

The optical component manufacturing method of the present disclosure facilitates the control of the width and thickness of the optical waveguide in the optical component, and enables the manufacture of the optical waveguide having such a structure so as to effectively suppress propagation loss.

Description of Embodiments of the Present Disclosure

First, contents of embodiments of the present disclosure are individually listed and described.

(1) An optical component manufacturing method of the present disclosure, comprises, preparation, laser irradiation, and condensed point movement. In the preparation, a glass member is prepared in which a continuous refractive index changing region is to be provided. In the laser irradiation, femtosecond laser light is irradiated onto the glass member so that it is condensed within the glass member. In the condensed point movement, a position of the condensed point is moved relative to the glass member along a scanning direction. The irradiated femtosecond laser light has the amount of energy to cause a light-induced refractive index change in the glass member. As a configuration 1A, a light intensity distribution on a plane including the condensed point of the femtosecond laser light and orthogonal to a thickness direction (X-axis direction) of the glass member has a flat-top region. The beam irradiation region on the plane including the condensed point and orthogonal to the X-axis direction is a beam spot of the femtosecond laser light. The beam irradiation region is a single continuous region defined by the contour of a region where a light intensity is $1/e^2$ or more of a maximum light intensity. The flat-top region is a region of ½ or more of the maximum light intensity and has an area of 0.45 times or more that of the beam irradiation region. Furthermore, as a configuration 1B, an angle between a direction in which a width of the beam irradiation region is widest (Y-axis direction) and the scanning direction is 70° or more and 110° or less, and an angle between the plane orthogonal to the thickness direction of the glass member and the scanning direction is 20° or less.

The configuration 1A facilitates the control of the width and thickness of the optical waveguide provided in the glass member. Also, the configuration 1B suppresses the refractive index fluctuation of the inner surface and the roughness of the side surface of the formed optical waveguide, resulting in suppression of propagation loss.

(2) In the above-mentioned (1), the preparation may include hydrogen injection of injecting hydrogen into the glass member. In this case, it is possible to reduce a modification threshold in the glass member by laser irradiation. In the injecting, 100% hydrogen gas is introduced into the chamber with the glass member installed, and the atmospheric pressure in the chamber is maintained at 10 atm or higher. The hydrogen injection period is one day or more and eight weeks or less. This allows hydrogen to be injected into the glass member.

(3) In the above-mentioned (1) or (2), the central region of the light intensity distribution may be flat to the extent that the maximum and minimum light intensities within the central region fall within a range of 75% or more and 125% or less of the average light intensity in the central region. The central region is a region that constitutes part of the flat-top region, includes the center of gravity of the beam irradiation region, and accounts for 50% of the area of the flat-top region. Ensuring sufficient flatness in the central region of the light intensity distribution makes it still easier to control of the width of the optical waveguide in the glass member.

(4) In any one of the above-mentioned (1) to (3), the beam spot may be formed by a first optical system including an aspherical lens or a second optical system including a condenser lens and a cylindrical lens. In the case where the beam spot is generated by the first optical system or the second optical system, the shape of the beam spot itself of the femtosecond laser light can be shaped into an arbitrary shape.

(5) An optical component of the present disclosure is an optical component manufactured by the manufacturing method of any one of the above-mentioned (1) to (4), wherein in the cross-section of the glass member orthogonal to the scanning direction, it is preferred that the refractive index changing region does not contain a refractive index periodic structure in which the refractive index periodically fluctuates along an axis passing through the refractive index changing region. The fact that the refractive index changing region does not contain a refractive index periodic structure means that the uniformity of the modification state of the cross-section of the refractive index changing region is ensured. By ensuring the uniformity of the modification state in the refractive index changing region, the propagation loss is controlled to less than 0.2 dB/cm.

(6) In the above-mentioned (5), an axis for checking the refractive index periodic structure should be an axis that forms an angle from 0° (parallel) to 10° with a reference axis (Y-axis direction) orthogonal to both the scanning direction and an irradiation axis along which the laser light is irradiated. As an aspect in which the refractive index periodic structure is included in the refractive index changing region, for example, optical waveguide formation by multi-scanning is known, in which laser light is scanned multiple times while being shifted along the Y-axis direction in order to ensure a sufficient width of the refractive index changing region that functions as an optical waveguide. In the case of multi-scanning, modified regions and unmodified regions including insufficiently modified regions are formed periodically in the refractive index changing region along the Y-axis direction, so that the uniformity of modified region cannot be ensured. On the other hand, by using the laser light in which the width of the beam spot shape along the Y-axis direction is sufficiently ensured, it is possible to form the refractive index changing region by a single laser scanning, and the modification uniformity of the refractive index changing region is also ensured. Thus, by checking the presence or absence of the refractive index periodic structure along the Y-axis direction, it is possible to identify the manufacturing method of the refractive index changing region that functions as an optical waveguide.

Details of Embodiments of the Present Disclosure

Hereinafter, specific example of an optical component manufacturing method and an optical component according to the present disclosure will be described in detail with reference to the accompany drawings. Note that the present invention is not limited to these examples and is indicated by the claims and is intended to include all changes within the meaning and scope equivalent to the claims. Also, in the description of the drawings, the same elements are denoted by the same reference numerals, and redundant description is omitted.

Figure 2:
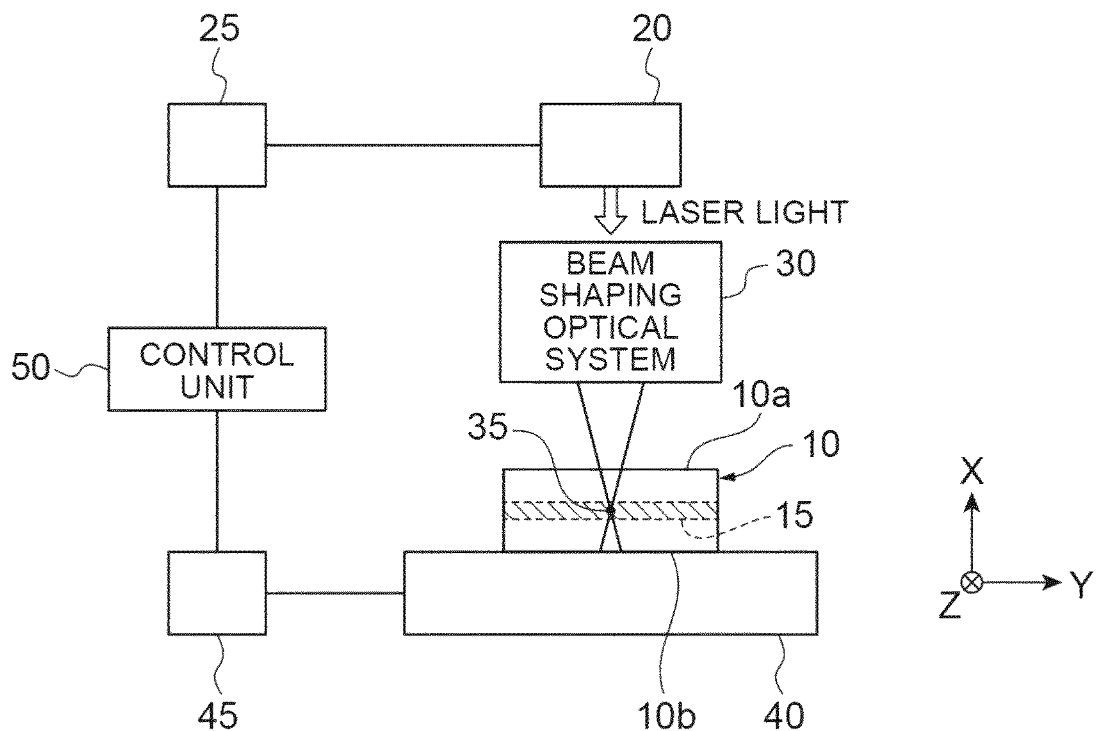
FIG. 2 is a diagram showing a configuration of a manufacturing apparatus for implementing the optical component manufacturing method according to the present disclosure.

FIG. 1 is a flowchart for explaining the optical component manufacturing method according to present disclosure. FIG. 2 is also a diagram showing a configuration of a manufacturing apparatus for implementing the optical component manufacturing method according to the present disclosure.

The manufacturing apparatus shown in FIG. 2 comprises a femtosecond laser 20, a laser driving unit 25 for driving the femtosecond laser 20, a beam shaping optical system 30 for shaping the beam spot of the femtosecond laser light into an arbitrary shape, an XYZ stage 40, a stage driving unit 45 for driving the XYZ stage 40, and a control unit 50 for controlling the operation of these various parts.

The laser driving unit 25 controls the power and repetition frequency of the pulsed laser light (femtosecond laser light) to be outputted from the femtosecond laser 20 according to instructions from control unit 50. As a result, the femtosecond laser light having a pulse width of several hundred femtoseconds or less can be outputted from the femtosecond laser 20. In particular, the femtosecond laser light having a pulse width set to several hundred femtoseconds or less is effective because its peak power can be $10^5$ W or more. The repetition frequency of the femtosecond laser light to be outputted should be 10 kHz or more to smooth the refractive index and structure of the optical waveguide formed within the glass material. On a device mounting surface of the XYZ stage 40, the glass member 10 is placed. The glass member 10 has a front surface 10*a* on which the laser light is irradiated and a rear surface 10*b* located on the opposite side of the front surface 10*a*. The glass member 10 contains germanium (Ge) to cause both a pressure-induced refractive index change $\Delta n_p$ and a structure-induced refractive index change $\Delta n_d$ by laser irradiation within a region sandwiched between the front surface 10*a* and the rear surface 10*b*. More specifically, it is comprised of a glass containing no dopant other than Ge, or a glass co-doped with boron (B) and Ge. Alternatively, a glass that is not doped with impurity that maximizes the effect of $\Delta n_p$, and so on, is also effective. These glasses are also a silica-based glass, a phosphate-based glass, a halide glass, and sulfide glass. The glass member 10 may be injected with hydrogen gas ($H_2$) beforehand. The femtosecond laser light outputted from the femtosecond laser 20 is condensed by the beam shaping optical system 30 within the glass member 10 on the XYZ stage 40, i.e. at the condensed point 35 positioned on the YZ plane. As a result, the refractive index changing region 15, which functions as an optical waveguide, is formed within the glass member 10.

The stage driving unit 45 drives the XYZ stage 40 so that the device mounting surface of the XYZ stage 40 moves along the X-axis direction, Y-axis direction, and Z-axis direction, respectively, according to instructions from the control unit 50. This configuration causes the position of the condensed point 35 of the femtosecond laser light to move relative to the glass member 10. The control unit 50 performs laser drawing by controlling each operation of the laser driving unit 25 and the stage driving unit 45 as described above. In the laser drawing, an arbitrary pattern of the refractive index changing region 15 is formed within the glass member 10. The arbitrary pattern of the refractive index changing region 15 corresponds to the shape of the optical waveguide projected on the YZ plane, taking into account the depth direction information of the X-axis.

Next, the optical component manufacturing method of the present disclosure, which manufactures an optical component in which an optical waveguide is provided by using the manufacturing apparatus having the structure described above, will be described according to the flowchart in FIG. 1. In the following description, as an example, the case of manufacturing a three-dimensional optical waveguide device, which is an optical component in which the refractive index changing regions 15 functioning as an arbitrary patterned optical waveguide is formed, will be described.

The optical component manufacturing method of the present disclosure comprises preparation and optical waveguide manufacture. First, in the preparation, a glass member 10, e.g. a parallel plate glass, which is to become a three-dimensional optical waveguide device, is prepared and once installed in a chamber. With the glass member 10 installed, 100% hydrogen gas is introduced into the chamber, and the atmospheric pressure in the chamber is maintained at 10 atm or more. The period of hydrogen injection is from one day to eight weeks. Thereby, hydrogen is injected into the glass member 10 (step ST10). If the optical waveguide manufacture is not performed immediately after the hydrogen injection in the step ST10, the glass member 10 injected with hydrogen is stored at a low temperature of −10° C. or lower (step ST15) in order to suppress the amount of hydrogen that leaves the glass member 10. The step ST15 (storage in low temperature) is performed during the period indicated from the point A to the point B in FIG. 1.

In the optical waveguide manufacture, the refractive index changing region 15, which is an arbitrary patterned optical waveguide, is formed within the glass member 10 in which hydrogen has been injected. Specifically, the glass member 10 injected hydrogen is placed on the device mounting surface of the XYZ stage 40 immediately after completion of the step ST10, and is irradiated with femtosecond laser light (step ST20). The control unit 50 controls the laser driving unit 25 so that the femtosecond laser 20 outputs the femtosecond laser light with the amount of energy to cause light-induced refractive index change within the glass member 10 and with a repetition rate of 10 kHz or more. The femtosecond laser light outputted from femtosecond laser 20 is condensed into within the glass member 10 by the beam shaping optical system 30. The beam shaping optical system 30 shapes the beam spot of the femtosecond laser light to be inputted into a predetermined shape. The light-induced refractive index change is formed in the beam irradiation region at the condensed point 35 of the femtosecond laser light. When the laser irradiation to the predetermined portion in the glass member 10 is completed, the control unit 50 controls the stage driving unit 45 to move the position of the glass member 10 on the device mounting surface of the XYZ stage 40 (step ST30). In this way, in the condensed point movement (step ST30), the position of the condensed point 35 of the femtosecond laser light within the glass member 10 moves by continuously or intermittently changing the setting position of the glass member 10 and/or the position of the condensed point 35 of the femtosecond laser light. The fluctuation of the condensed point 35 in the depth direction relative to the glass member 10 is limited so that an angle between a plane orthogonal to the thickness direction of the glass member 10 and the moving direction falls within a range from −20° to +20°.

The laser irradiation in the step ST20 and the condensed point movement in the step ST30, i.e. the operation control of the laser driving unit 25 and the stage driving unit 45 by the control unit 50, are performed repeatedly while changing the irradiation conditions or under the same conditions (step ST40) until the predesigned optical waveguide pattern is formed within the glass member 10, as shown at point C in FIG. 1. When the formation of the refractive index changing region 15, which is the optical waveguide, into the glass member 10 is completed (step ST40), the glass member 10 is annealed (step ST50) to perform aging treatment and remove residual hydrogen so that Δn does not change over a long period of time. Through the above process, i.e. the step ST10 to the step ST50, or the step ST10 to the step ST50 including the step ST15, an optical component in which an optical waveguide is provided is obtained.

For example, as shown in FIG. 3, an optical system including an aspherical lens, an optical system combining a condenser lens and a cylindrical lens, and the like are listed as the beam shaping optical system 30. The upper part of FIG. 3 (In FIG. 3, it is referred to as "aspherical lens") shows the configuration of the optical system including the aspherical lens 110. The lower part of FIG. 3 (In FIG. 3, it is referred to as "condenser lens+cylindrical lens") shows the configuration of the optical system combining the condenser lens and the cylindrical lens.

Figure 4:
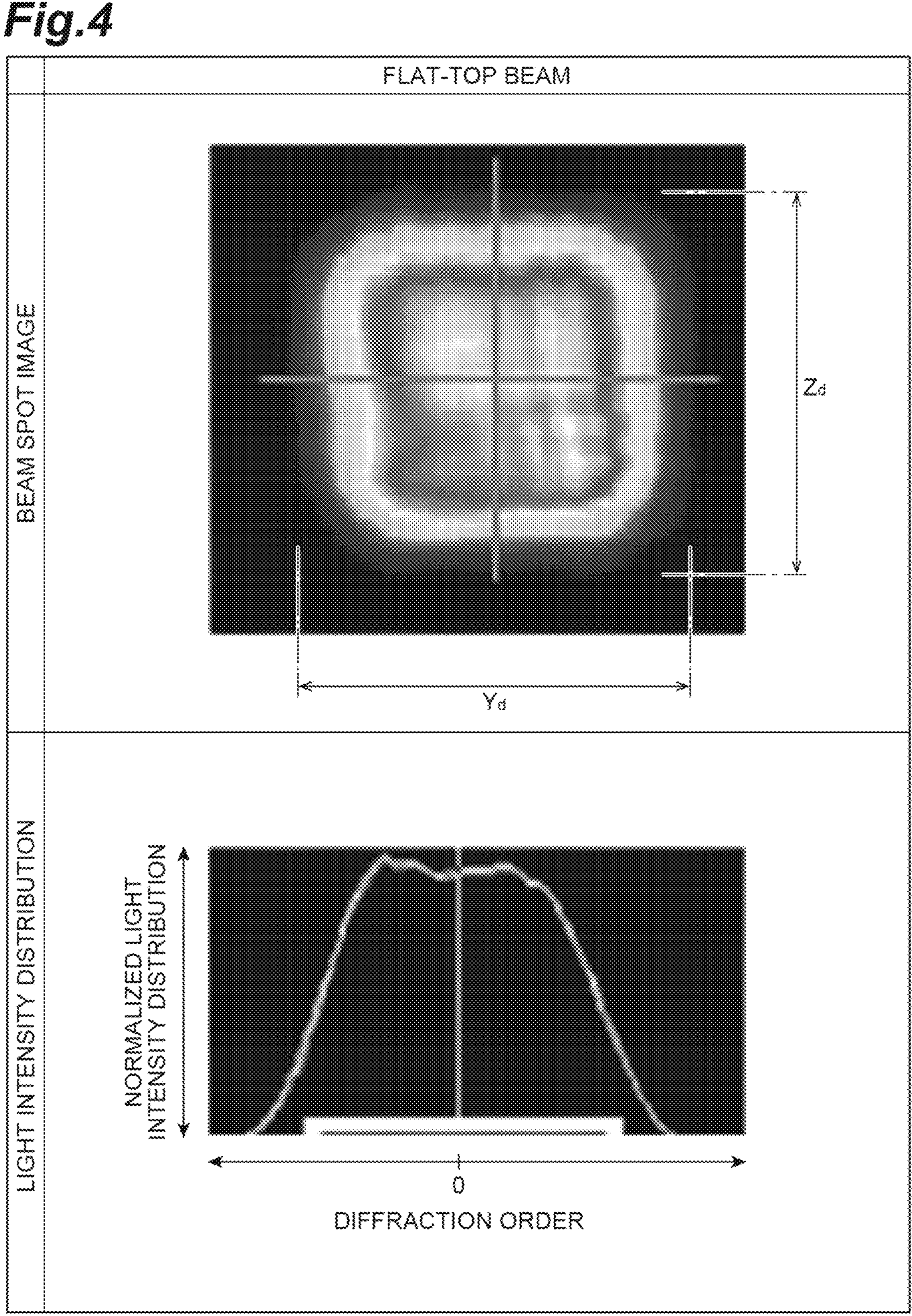
FIG. 4 is a diagram showing a beam spot image and a flat-top light intensity distribution of a rectangular-shaped flat-top beam.

The "aspheric lens" optical system (first optical system) shown in the upper part of FIG. 3 includes an aspheric lens 110. If necessary, a beam diameter control mechanism 111 may be provided upstream or downstream of the aspherical lens 110. The beam diameter control mechanism 111 may be combined with an aspherical lens other than the aspherical lens 110. The light intensity distribution of the femtosecond laser light outputted from the aspherical lens 110 is defined on the beam waist BW where the condensed point 35 is located and has a flat-top shape. The beam waist BW is contained in the YZ plane. The beam spot of the femtosecond laser light corresponds to a beam irradiation region 350 with a width along the Y-axis direction of Ya and a width along the Z-axis direction of $Z_d$ ($\leq Y_d$). For comparison, the beam spot image of a square-shaped flat-top beam which is beam-shaped by the "aspheric lens" optical system is shown in the upper part of FIG. 4, and its light intensity distribution is shown in the lower part of FIG. 4. This beam spot image of the square-shaped flat-top beam corresponds to the beam irradiation region 350 set at $Z_d=Y_d$.

The "condenser lens+cylindrical lens" optical system (second optical system) shown in the lower part of FIG. 3 includes a condenser lens 121 and a cylindrical lens 122. A femtosecond laser light having a beam spot corresponding to the beam irradiation region 350, that is the same as the "aspheric lens" optical system described above, with a width along the Y-axis direction of Ya and a width along the Z-axis direction of $Z_d$ ($\leq Y_d$) is outputted. Alternatively, an optical system combining a cylindrical lens 122 and a cylindrical lens different from the cylindrical lens 122 may be placed in front of the condenser lens 121, and a collimated elliptical beam with a varying beam diameter on an axis orthogonal to the beam diameter on the spherical axis of the cylindrical lens is prepared. In this case, a femtosecond laser light whose short and the diameters correspond to each other can be outputted on the BW by condensation of the condenser lens.

Figure 5:
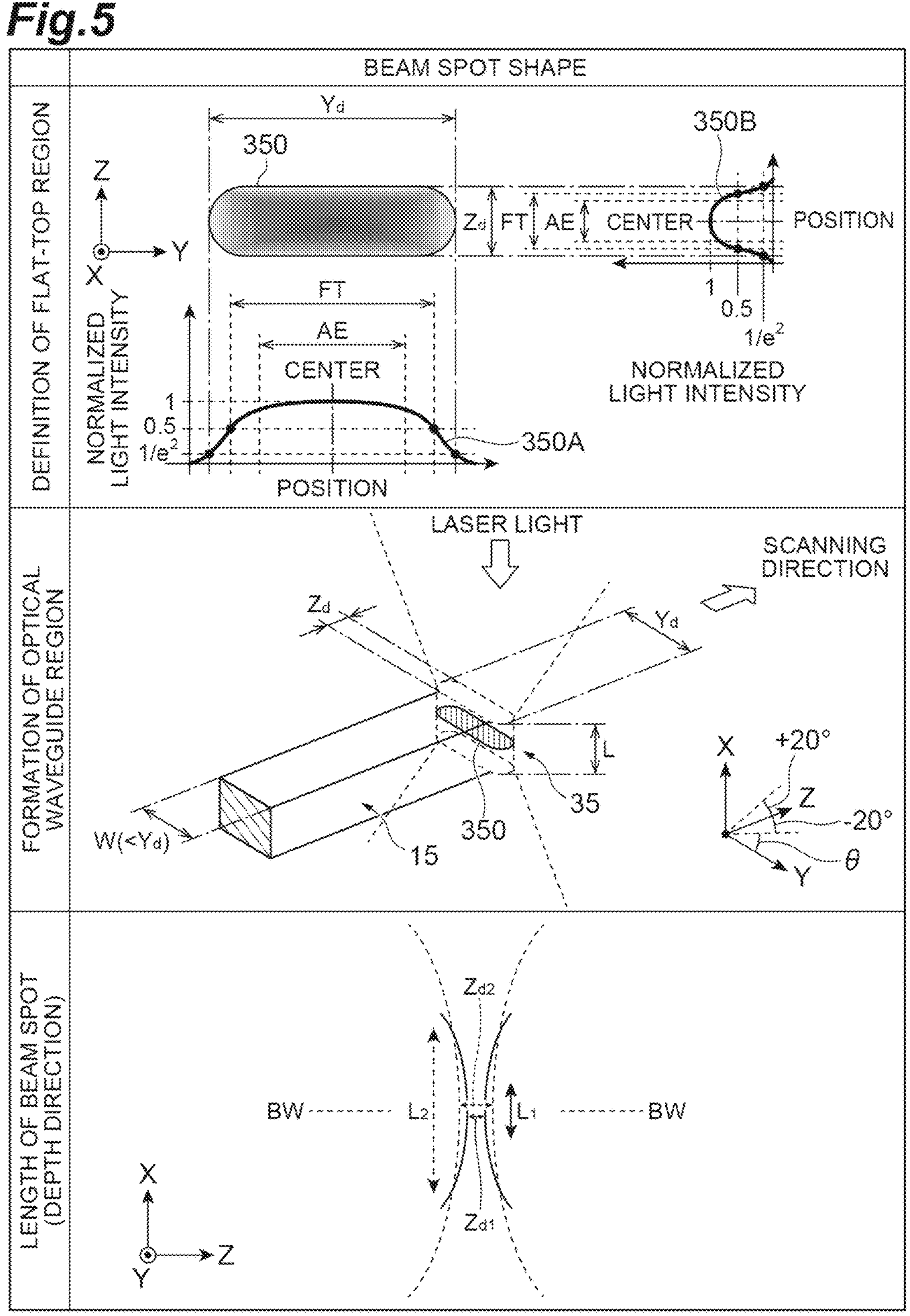
FIG. 5 is a diagram for explaining a structure of a beam spot.

FIG. 5 is a diagram for explaining a structure of a beam spot. The upper part of FIG. 5 (in FIG. 5, it is referred to as "definition of flat-top region") shows a plan view of the beam irradiation region 350 and the light intensity distribution to explain the definition of the flat-top region FT and its flatness. The middle part of FIG. 5 (in FIG. 5, it is referred to as "formation of optical waveguide region") shows a positional relationship of the condensed point 35, the beam irradiation region 350, and the like as well as the formation process of the refractive index changing region 15 within the glass member 10. The lower part of FIG. 5 (in FIG. 5, it is referred to as "length of beam spot (depth direction)") shows a diagram for explaining the thickness adjustment (length adjustment) of the beam spot along the depth direction.

The upper part of FIG. 5 is a conceptual diagram of the beam irradiation region 350 of the femtosecond laser light, which is beam-shaped by the "aspheric lens" optical system shown in the upper part of FIG. 3 or the "condenser lens+cylindrical lens" optical system shown in the lower part of FIG. 3. This beam irradiation region 350 is the region on the YZ plane (beam waist BW) when the femtosecond laser light is condensed from the front surface of the glass member 10 to a depth of, for example, approximately 100 μm in the X-axis direction, as shown in the middle part of FIG. 5. The upper part of FIG. 5 further shows a flat-top shaped light intensity distribution 350A along the Y-axis direction and a flat-top shaped light intensity distribution 350B along the Z-axis direction, and a flat-top shaped light intensity distribution of the beam irradiation region 350 is defined by these light intensity distributions 350A and 350B.

The beam irradiation region 350 is defined by the contour of the region where the light intensities of the light intensity distributions 350A and 350B are $1/e^2$ of the maximum light intensity, and the width along the Y-axis is Ya and the width along the Z-axis is Za. The flat top region FT is defined by the contour of the region where the light intensities of the light intensity distributions 350A and 350B are ½ of the maximum light intensity, and the flat top region FT has an area that is 0.45 times or more that of the beam irradiation region 350. Furthermore, the flatness of the light intensity distribution of the beam irradiation region 350 defined by the light intensity distributions 350A and 350B is defined by the flatness of the central region AE of the light intensity distribution. That is, the central region AE has flatness to the extent that the maximum and minimum light intensities in the central region AE fall within a range of 55% or more and 145% or less of the average light intensity in the central region AE. The central region AE constitutes a part of the flat-top region FT, includes the center of gravity of the beam irradiation region 350, and accounts for 50% of the area of the flat-top region FT.

The width $Y_d$ along the Y-axis of the beam irradiation region 350 shown in the upper and middle parts of FIG. 5 is adjusted so that the optical waveguide width W to be formed is obtained, and the width $Z_d$ along the Z-axis of the beam irradiation region 350 is adjusted so that a specified amount of refractive index change is obtained in the beam irradiation region 350. By moving the condensed point 35 of the femtosecond laser light along the Z-axis direction corresponding to the scanning direction, the refractive index changing region 15 that functions as an optical waveguide is formed by a single scanning, as shown in the middle part of FIG. 5. As described above, FIG. 4 shows a square-shaped beam spot image ($Y_d=Z_d$) of the femtosecond laser light beam-shaped by the "aspherical lens" optical system and a flat-top-shaped light intensity distribution. The width $Y_d$ in the Y-axis direction contributes to the optical waveguide width, while the width $Z_d$ in the Z-axis direction contributes to the amount of refractive index change within the glass member 10, so each can be treated as an independent parameter. The width $Z_d$ is a parameter which, as shown in the lower part of FIG. 5, can adjust the change in power density of the laser light in the X-axis direction corresponding to the thickness direction of the glass member 10, and the Rayleigh length $Z_r$, and can also adjust the thickness L of the optical waveguide in addition to the amount of refractive index change. The thickness L is a length along the X-axis of the region in which the refractive index is changed. For example, when $Z_d=Y_d$, the power density of the beam irradiation region 350 at the condensed point 35 is reduced, so it is necessary to increase the light intensity of the irradiated femtosecond laser light. On the other hand, when $Z_d<Y_d$, the reduction in the power density of the irradiated laser light is suppressed compared to the square-shaped beam irradiation region ($Z_d=Y_d$), and thus the required light intensity for modification within the glass member 10 can be reduced. Therefore, the case of $Z_d<Y_d$ is more effective than the square-shaped case.

Furthermore, when forming a curved optical waveguide within the glass member 10, the angle θ between the direction in which the width of the beam irradiation region 350 is widest and the scanning direction should be 70° or more and 110° or less, i.e. a range from −20° to +20° with respect to 90° as a reference, and the angle between the plane orthogonal to the thickness direction of the glass member and the scanning direction should be 20° or less. In this case, the roughness of the side surface of the formed optical waveguide is suppressed and the propagation loss can be suppressed as a result of the flattening of the light intensity distribution of the width $Y_d$ in the Y-axis direction. The details of the flattening of the light intensity distribution of the width $Y_d$ in the Y-axis direction are described below in FIG. 7.

The Rayleigh length $Z_r$ means a distance between the position where the area of the beam cross-section is two times that of the beam cross-section at the beam waist BW and the beam waist BW (condensed point), and is given by the following formula (1).

$$z_r = \frac{\pi \cdot \omega^2}{\lambda} \tag{1}$$

where ω: beam radius

In order to obtain a thickness L of a predetermined optical waveguide, it is necessary that the Rayleigh length $Z_r$ is appropriate, and $Z_r$ may be adjusted to be two times or less L, or one time or less L.

When the thickness L of the optical waveguide is extended as described above, a decrease in the power density of the femtosecond laser light irradiated within the glass member 10 occurs. Therefore, it is necessary to irradiate the femtosecond laser light having the light intensity exceeding the power threshold that causes the refractive index change (modification threshold: $I_{th}$). On the other hand, although a wavelength-conversion wave is more effective than a fundamental wave in efficiently inducing multiphoton absorption, a decrease in wavelength-conversion efficiency with an increase in repetition frequency is inevitable, and in some cases it has been difficult to secure the necessary modification threshold $I_{th}$. The fundamental wave has a wavelength of 1.03 μm, and the wavelength-conversion wave is, for example, a second harmonic (SHG) having a wavelength of 515 nm.

The inventors therefore examined a method of injecting hydrogen into the glass member 10 in which the refractive index changing region 15, which functions as an optical waveguide, is formed. There are no reported cases of laser drawing by irradiation of femtosecond laser light on hydrogen-implanted materials in the aforementioned prior art documents. In addition, there are no reported cases of beam shaping suitable for hydrogen-implanted materials.

Figure 6:
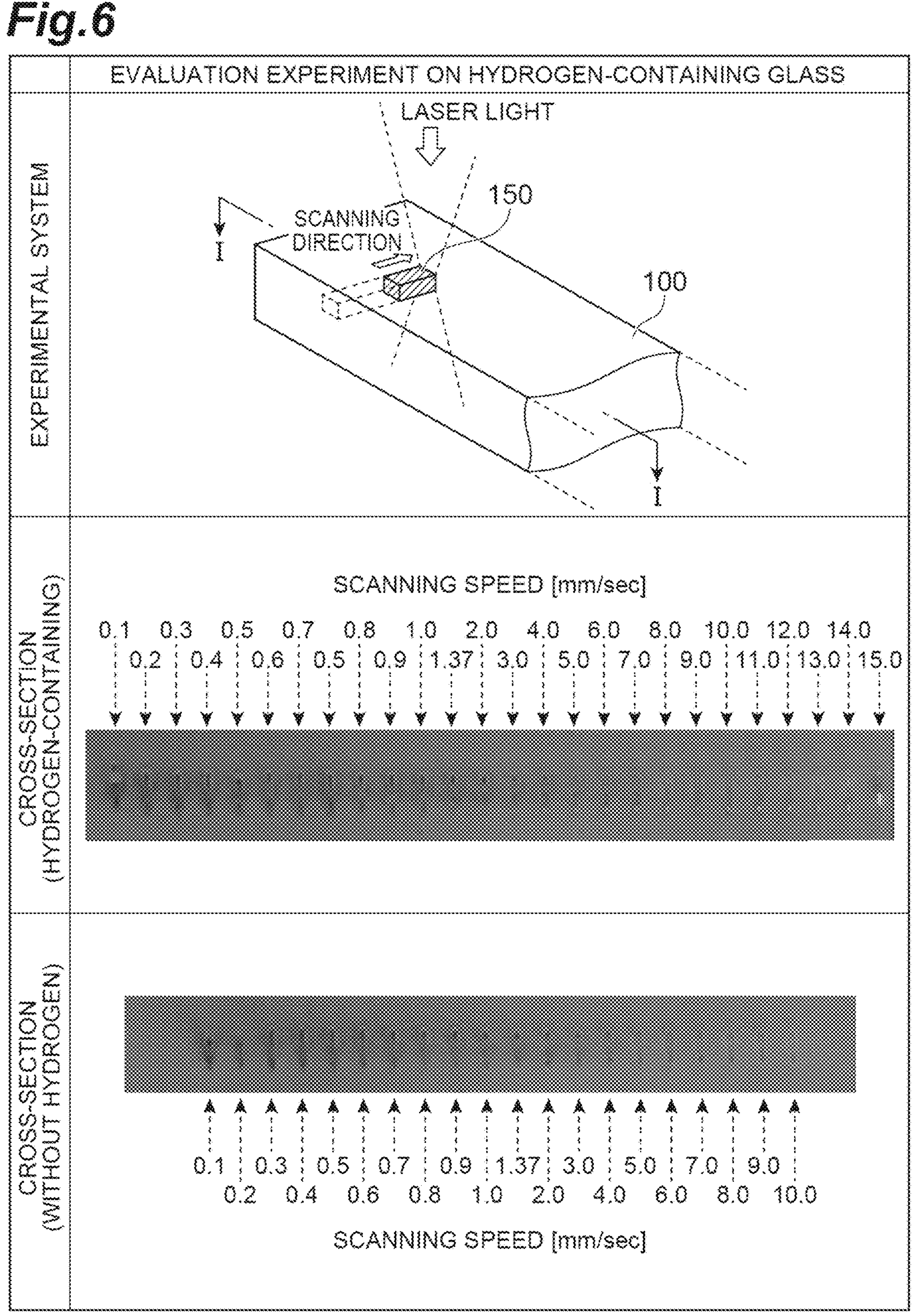
FIG. 6 is a diagram for explaining an evaluation experiment on hydrogen-containing glass.

FIG. 6 is a diagram for explaining an evaluation experiment on hydrogen-containing glass. The upper part of FIG. 6 (in FIG. 6, it is referred to as "experimental system") shows a structure of the experimental system for evaluating the modification state within the glass samples 100 in the cases where the glass members 100 are in the hydrogen-containing state and in the hydrogen-free state. The middle part of FIG. 6 (in FIG. 6, it is referred to as "cross-section (hydrogen-containing)") shows a cross-section (after polishing) of the glass sample 100 containing hydrogen along the I-I line shown in the upper part of FIG. 6. The lower part of FIG. 6 (in FIG. 6, it is referred to as "cross-Section (without hydrogen)") shows a cross-section (after polishing) of a glass sample 100 without hydrogen along the I-I line shown in the upper part of FIG. 6.

In this evaluation experiment, as shown in the upper part of FIG. 6, the glass samples 100 (a member with hydrogen-implanted treatment and a member without hydrogen-implanted treatment) were prepared, and the formation state of the modified region 150 in each of the glass samples 100 were observed while changing the scanning speed. The modified region 150 corresponds to the refractive index changing region 15. Specifically, the femtosecond laser light irradiated to each of the glass samples 100 has a wavelength of 515 nm, a repetition rate of 100 kHz or more and 1 MHz or less, a pulse width of 195 fs or more and 350 fs or less, and a pulse energy of 100 nJ or more and 500 nJ or less. The femtosecond laser light is condensed at a depth position of 10 μm or more and 200 μm or less from the front surface of each of the glass samples 100. The femtosecond laser light was irradiated along the scanning direction shown in the upper part of FIG. 6.

The cross-section of the glass sample 100 shown in the middle part of FIG. 6 is the cross-section of the sample containing hydrogen, when the scanning speed of the femtosecond laser light was changed from 0.1 mm/sec to 15.0 mm/sec. On the other hand, the cross-section of the glass sample 100 shown in the lower part of FIG. 6 is the cross-section of the sample without hydrogen, when the scanning speed of the femtosecond laser light was changed from 0.1 mm/sec to 10.0 mm/sec. The formation of the modified region 150 was confirmed up to a scanning speed of 10.0 mm/sec regardless of the presence of hydrogen containing. However, in the sample containing hydrogen shown in the middle part of FIG. 6, the modified region 150 was confirmed up to a scanning speed of 15.0 mm/sec, and it was found that the formation (writing) of the modified region 150 was possible even at a scanning speed 1.5 times higher than that of the sample not containing hydrogen shown in the lower part of FIG. 6. Namely, it was found that when using a glass member with hydrogen implantation treatment, the reduction in the modification threshold $I_{th}$ can be 1.5 times greater than when using a glass member without hydrogen implantation treatment. It was inferred that the modification threshold $I_{th}$ can be further reduced by increasing the hydrogen content. In terms of the amount of energy required for the modification, the hydrogen treatment increases the compositional change of the glass member to form an optical waveguide width W that is wider than the width $Y_d$ of the beam, which allows the width $Y_d$ to be reduced relative to the desired optical waveguide width W, and then the refractive index reduction due to the decrease in power density can be compensated. Thus, it can be seen that the reduction of the modification threshold $I_{th}$ due to beam shaping to femtosecond laser light can be compensated by using the glass member containing hydrogen. In other words, it is possible to form a predetermined modified region even with a single laser irradiation.

Figure 7:
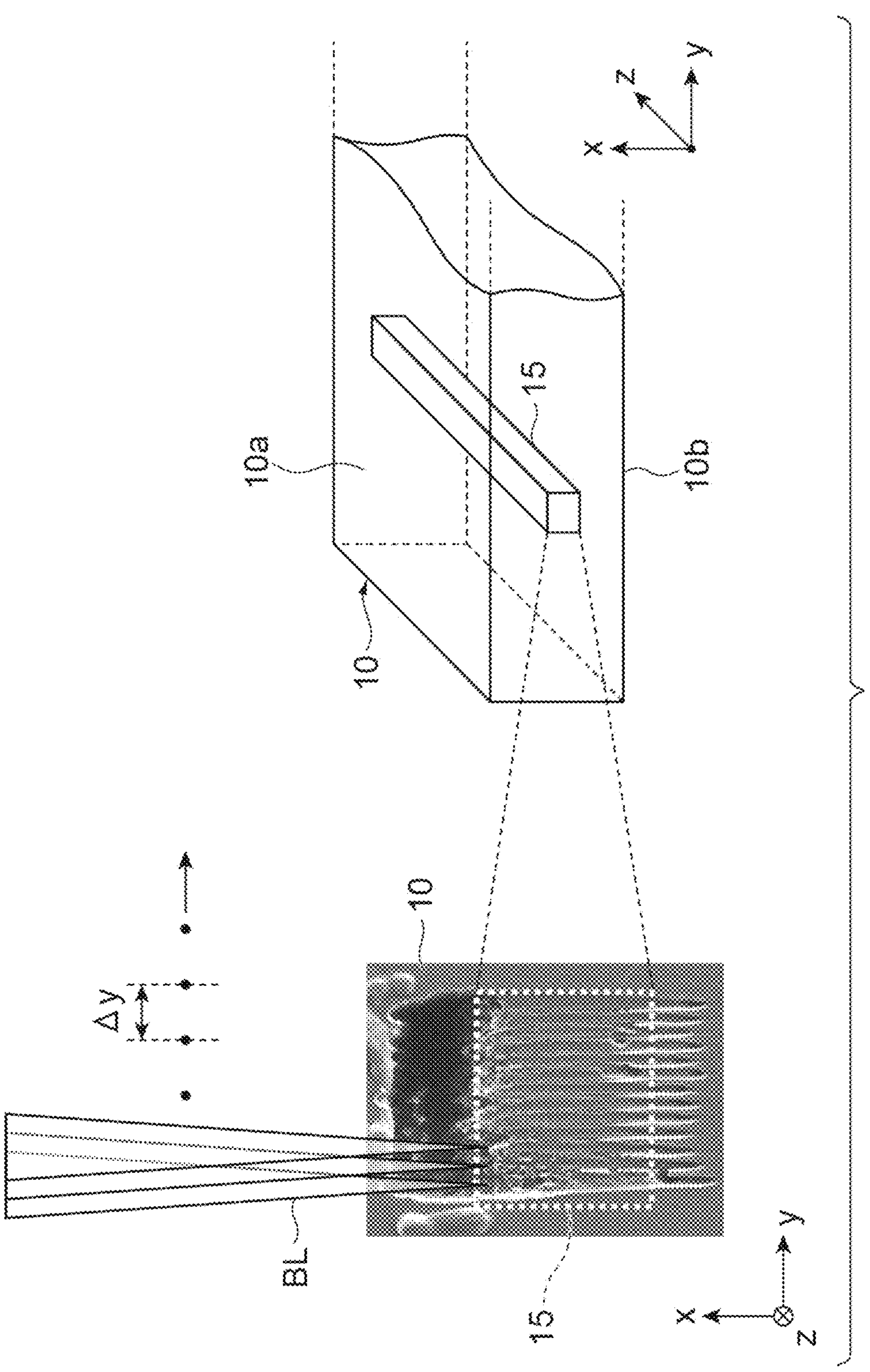
FIG. 7 is a diagram for explaining an example where the same effect as in the present disclosure cannot be obtained.

The example shown in FIG. 7 is an example that does not have the same effect as the embodiment of the present disclosure. Non-Patent Document 3 proposes multi-scanning, in which, to obtain the width of the core serving as the optical waveguide in the transverse direction by a single condensed beam BL (laser light), after beam scanning in the optical waveguide propagation direction (Z-axis direction) is completed, the beam spot is shifted by Δy in the Y-axis direction and beam scanning is performed in the Z-axis direction as in the previous beam scanning, the process being repeated several times. This waveguide formation method is effective because the optical waveguide width can be obtained as designed. The inventors formed an optical waveguide structure corresponding to the refractive index changing region 15 in the glass member 10 by this optical waveguide formation method, and observed the cross-sectional shape (XY cross-section) of the optical waveguide by etching with hydrogen fluoride (HF), hydrofluoric acid, or the like. As a result, as shown in FIG. 7, multiple bamboo skewer-like shapes were observed overlapping each other, and the number of the shapes and the interval between the bamboo skewer shapes were consistent with the number of scans of laser light and the scanning interval Δy, so it is presumed that the processing traces reflecting the laser irradiation conditions (drawing conditions) were observed. In the XY cross-section after that etching, the length of each individual bamboo skewer shape and the etching depth are non-uniform. The non-uniformity of the length of the bamboo skewer shapes is regarded as a fluctuation of the waveguide structure and becomes a factor that increases propagation loss. The etching depth represents the difference in etching rate, which depends on large or small of the modification (refractive index) modulation. Therefore, from the XY cross-section shown in FIG. 7, it can be read that the refractive index fluctuation is large inside the waveguide, which, like the waveguide structure fluctuation, is a factor that increases propagation loss. On the other hand, the embodiment of the present disclosure is also effective for hydrogen-impregnated materials. That is, in the embodiment of the present disclosure, the timing of increasing the refractive index in the Y-axis direction is the same. Therefore, according to the embodiment of the present disclosure, hydrogen is consumed at the same timing, and as a result, the uniform modification within the glass member 10 is expected compared to the case of laser drawing one by one.

In the manufacturing method using multi-scanning in Non-Patent Document 3, the laser irradiation is performed while shifting the irradiation point along the Y-axis direction by Δy=0.4 μm with the beam spot diameter: 2 μm or less. The beam irradiated area at the nth operation and the beam irradiated area at the (n+1)th operation are calculated to overlap by approximately 1.6 μm along the Y-axis direction. For example, assuming that the modification effect due to hydrogen containing (hydrogen-containing effect) is equivalent to the beam spot diameter, the hydrogen-containing effect can be maximally utilized since hydrogen is filled with the maximum amount at the first irradiation. However, in the second irradiation, the hydrogen-containing effect is significantly reduced or not obtained at all in the region of 1.6 μm with respect to the Y-axis direction. This is a factor that increases the refractive index fluctuation in the formed optical waveguide, and therefore, multi-scanning is not suitable for laser irradiation to the hydrogen-containing glass materials.

To reduce propagation loss, the modification state in the cross-section of the refractive index changing region 15 should be uniform. In FIG. 7 above, single-mode propagation was confirmed as a result of multi-scanning in which the laser light irradiation position was shifted by Δy for the glass member 10 mainly comprised of silicon dioxide ($SiO_2$). However, when the modification within the waveguide cross-section was investigated by etching, a bamboo skewer-like waveguide shape was obtained, and the propagation loss was 0.2 dB/cm or more and 10 dB/cm or less. To obtain a waveguide having a propagation loss of less than 0.2 dB/cm, the modification within the waveguide must be uniform in addition to the required waveguide size.

Figure 8:
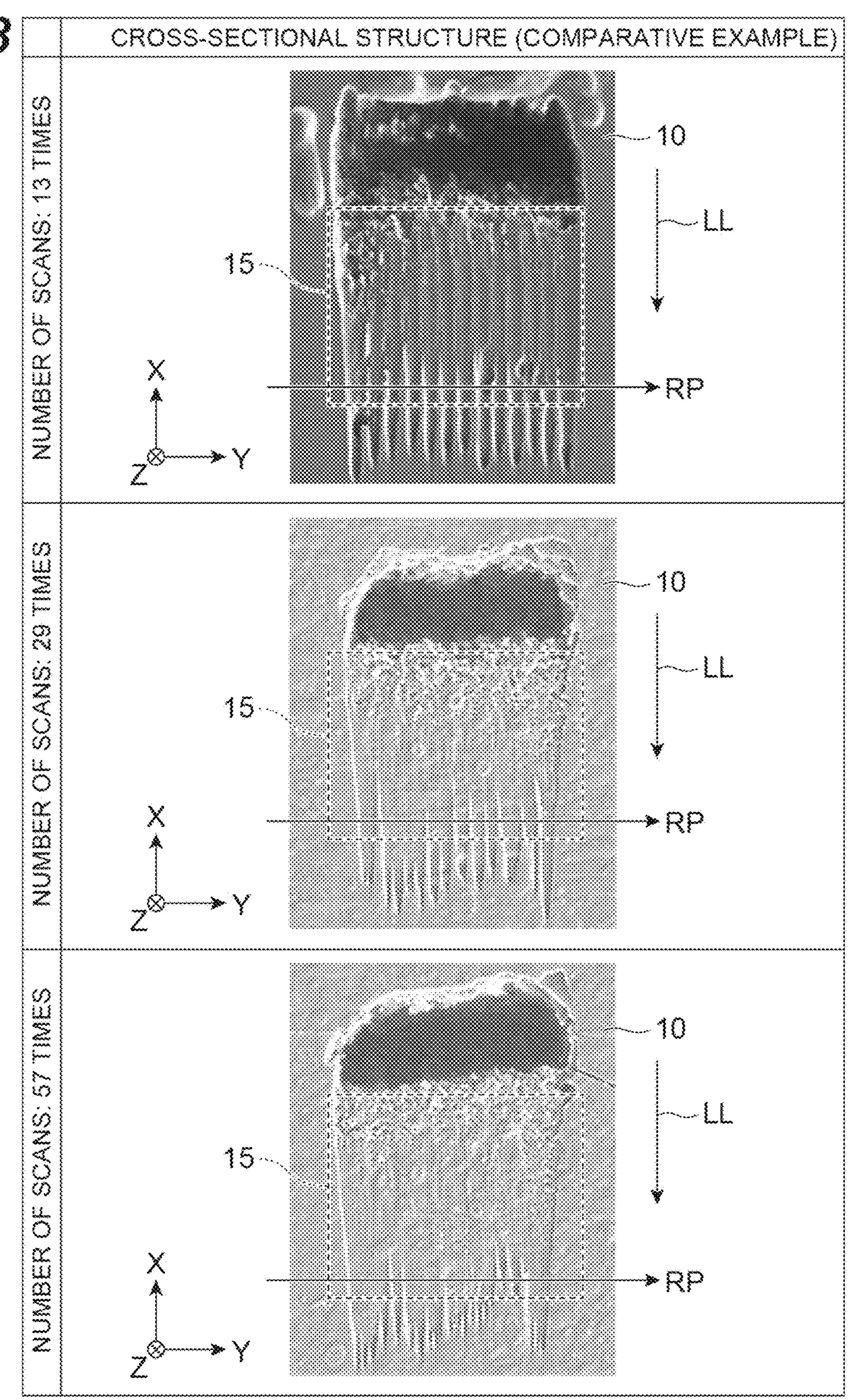
FIG. 8 is a diagram showing a cross-sectional structure of a refractive index changing region which functions as an optical waveguide and which is obtained by the optical component manufacturing method according to a comparative example.
Figure 9:
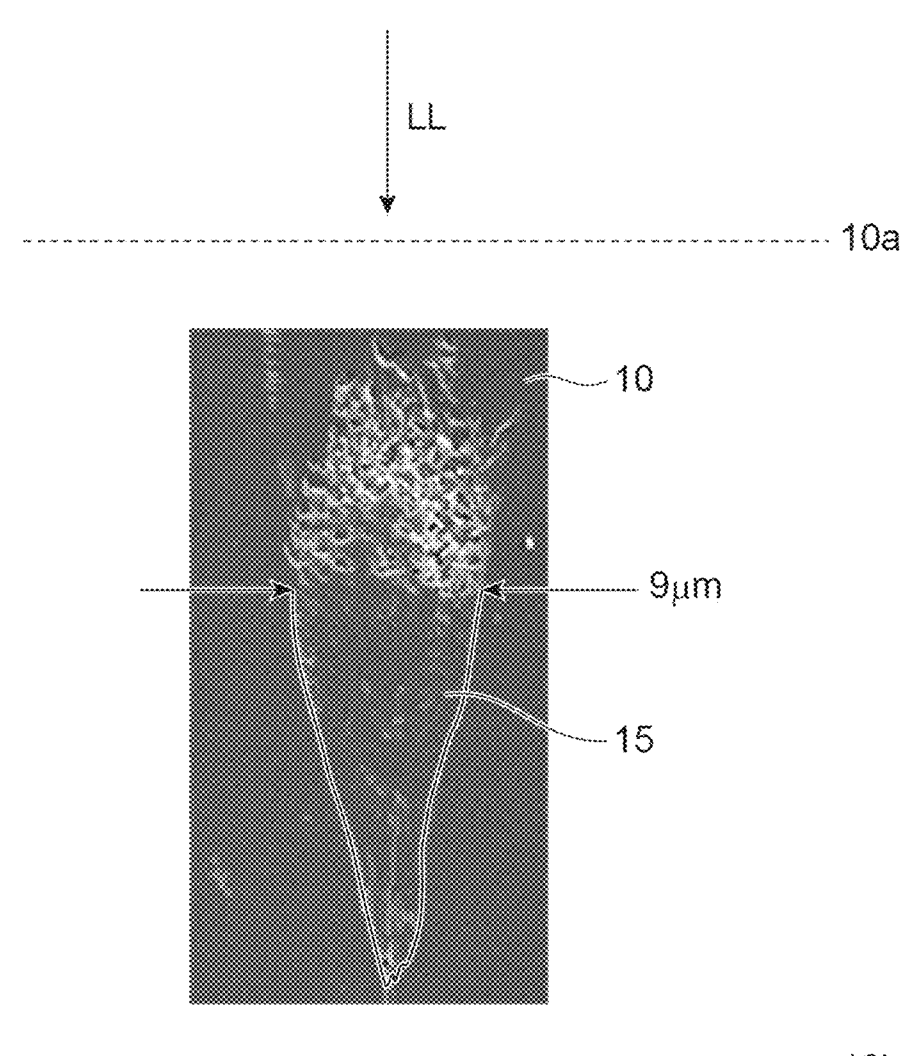
FIG. 9 is a diagram showing a cross-sectional structure of a refractive index changing region which functions as an optical waveguide and which is obtained by the optical component manufacturing method according to the present disclosure.
Figure 9:
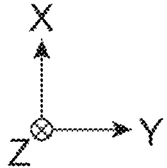

The inventors therefore conducted the following experiments to investigate the modification state of the refractive index changing region 15, which functions as an optical waveguide. The results of these experiments are shown in FIGS. 8 and 9. FIG. 8 is a diagram showing a cross-sectional structure of the refractive index changing region that functions as an optical waveguide, obtained by the optical component manufacturing method of the comparative example (in FIG. 8, it is referred to as "cross-sectional structure (comparative example)"). The upper part of FIG. 8 (in FIG. 8, it is referred to as "number of scans: 13 times") shows an example of multi-scanning, in which a laser light having a Gaussian distribution of light intensity is irradiated 13 times. The middle part of FIG. 8 (in FIG. 8, it is referred to as "number of scans: 29") shows an example of multi-scanning, in which a laser light having a Gaussian distribution of light intensity is irradiated 29 times. The lower part of FIG. 8 (in FIG. 8, it is referred to as "number of scans: 57") shows an example of multi-scanning, in which a laser light having a Gaussian distribution of light intensity is irradiated 57 times. FIG. 9 is a diagram showing a cross-sectional structure of the refractive index changing region obtained by the optical component manufacturing method according to the present disclosure, which is formed by a single scanning of laser light having a flat-top shaped light intensity distribution and functions as an optical waveguide. The figures shown in FIGS. 8 and 9 are both SEM (Scanning Electron Microscope) observation images of the etched cross-section. Specifically, first, the cross-section of the sample obtained by cutting the formed refractive index changing region 15 is polished. Subsequently, the sample whose cross-section has been polished is immersed in a solution of BHF solution (buffered hydrofluoric acid) diluted with pure water for 1 to 60 minutes to etch the cross-section. By observing the etched cross-section by SEM, the modification state of the formed refractive index changing region 15 is evaluated.

The comparative example experiment shown in FIG. 8 was performed under the same conditions as in FIG. 7 (Non-Patent Document 3). In the comparative examples shown from the upper part to the lower part in FIG. 8, the arrow LL indicates the irradiation direction of laser light. In each comparative example, the laser light was scanned along the Z-axis direction was performed multiple times while the irradiation point was shifted along the Y-axis direction by Δy.

For example, in the comparative example shown in the upper part of FIG. 8, it can be seen that the modified shape of the refractive index changing region 15 is a shape of 13 bamboo skewer-shaped modified regions extending along the arrow LL, aligning along the Y-axis direction. It can also be seen that in the comparative example shown in the middle and lower parts of FIG. 8, respectively, a plurality of bamboo skewer-like modified regions are periodically formed along the Y-axis direction. In particular, as the number of scans of the laser light increases, the bamboo skewer-shaped modified regions are densely arranged. For example, in the example in the lower part of FIG. 8, the central portion of the refractive index changing region 15 is approximately uniformly modified so that the propagation loss is approximately 0.2 dB/cm, which is reduced compared to the examples shown in the upper and middle parts of FIG. 8. However, in all of the examples shown in the upper to lower parts of FIG. 8, the refractive index periodic structure in which the refractive index modification state fluctuates periodically along the axis RP, which is 0° (parallel) to the Y-axis or at an angle of 10° or less to the Y-axis, can be clearly seen, making it difficult to further reduce the propagation loss.

On the other hand, the wavelength of the laser light used in the experiments of the present disclosure shown in FIG. 9 is effective in the wavelength range of −10 nm or more and +10 nm or less with respect to 1030 nm as a reference, the wavelength range of −10 nm or more and +10 nm or less with respect to 1060 nm as a reference, and, second harmonic generation (SHG) and third harmonic generation (THG) in the respective wavelength ranges. A pulse width of 500 fs or less is effective. A repetition frequency of 100 kHz to 5 MHz is effective. The beam spot diameter of the irradiated laser light in the Z-axis direction is condensed to 1 μm or near the diffraction limit, the beam spot diameter in the Y-axis direction is 2 μm or more and 10 μm or less, and its light intensity distribution has a flat-top shape. In the experiment of the present disclosure, the laser light having a flat-top shaped light intensity distribution is condensed within the glass member 10 comprised of $SiO_2$ and scanned only one time along the Z-axis direction to form a refractive index changing region 15 that functions as an optical waveguide. In the experiment shown in FIG. 9, the NA of the condenser lens is 0.40 or more and 0.55 or less. The wavelength of the irradiated laser light is 1030 nm or its SHG of 515 nm. The pulse width is 100 fs or more and 450 fs or less. The scanning speed is 0.01 mm/sec or more and 10 mm/sec or less. The pulse energy is 30 nJ or more and 1000 nJ or less. The repetition frequency is 100 kHz or more and 5 MHz or less. The position of the laser irradiation is 50 μm or more and 250 μm or less in depth from the front surface 10*a* toward the rear surface 10*b* of the glass member 10. In FIG. 9, the arrow LL indicates the irradiation direction of laser light.

In actual experiments, the width of the refractive index changing region 15, i.e., the width of the optical waveguide, can be controlled at 3 μm or more and 10 μm or less by changing the pulse energy, and in the example shown in FIG. 9, the maximum width of the refractive index changing region 15 was 9 μm under the above laser light irradiation conditions. On the side of the rear surface 10*b* rather the portion indicated by the arrow in FIG. 9, no refractive index periodic structure was found as in each of the comparative examples in the upper to lower parts of FIG. 8 above, and the uniformity of the modification state of the refractive index changing region was also found to be improved.

In the example of FIG. 9, it is difficult to control the flatness on the side of the rear surface 10*b*, out of the refractive index changing region 15, but flattening is possible by controlling the light intensity distribution of the irradiated laser light, and it can be predicted that a propagation loss of less than 0.2 dB/cm can be obtained by preparing the refractive index changing region 15 with such a suitable cross-sectional shape. From this, the modified shape in the cross section of the refractive index changing region 15 should have no periodicity of refractive index fluctuation along the axis that makes an angle from 0° to 10° to the Y-axis, which is effective in reducing the propagation loss.

APPENDIX

An optical component comprising:

a glass member having a front surface to which a laser light is irradiated and a rear surface located on the opposite side of the front surface, a continuous refractive index changing region provided in a glass region between the front surface and the rear surface, wherein in a cross-section of the glass member orthogonal to a longitudinal direction of the refractive index changing region, the refractive index changing region does not contain a refractive index periodic structure in which a refractive index periodically fluctuates along an axis passing through the refractive index changing region.

REFERENCE SIGNS LIST

10 . . . Glass member
10*a* . . . Front surface
10*b* . . . Rear surface
15 . . . Refractive index changing region (optical waveguide)
20 . . . Femtosecond laser
25 . . . Laser driving unit
30 . . . Beam shaping optical system
35 . . . Condensed point
40 . . . XYZ stage
45 . . . Stage driving unit
50 . . . Control unit
100 . . . Glass sample
110 . . . Aspherical lens
111 . . . Beam diameter control mechanism
121 . . . Condenser lens
122 . . . Cylindrical lens
150 . . . Modified region
350 . . . Beam irradiation region
350A, 350B . . . Light intensity distribution
FT . . . Flat-top region
AE . . . Central region
BW . . . Beam waist
LL . . . Arrow
RP . . . Axis.

The invention claimed is:

1. An optical component manufacturing method, comprising:

preparing a glass member in which a continuous refractive index changing region is to be provided, irradiating femtosecond laser light onto the glass member so as to condense it within the glass member, and moving a position of a condensed point of the femtosecond laser light relative to the glass member along a scanning direction, wherein:

the femtosecond laser light has an energy amount that causes a light-induced refractive index change in the glass member, a light intensity distribution of the femtosecond laser light on a plane including the condensed point and orthogonal to a thickness direction of the glass member has a flat-top region, a beam irradiation region on the plane including the condensed point and orthogonal to the thickness direction of the glass member is a beam spot of the femtosecond laser light and is a single continuous region defined by a contour of a region where a light intensity in the light intensity distribution is $1/e^2$ or more of a maximum light intensity, the flat-top region is a region of ½ or more of the maximum light intensity, an area of the flat-top region is 0.45 times or more that of the beam irradiation region, an angle between a direction in which a width of the beam irradiation region is widest and a scanning direction is 70° or more and 110° or less, and an angle between the scanning direction and the plane orthogonal to the thickness direction of the glass member is 20° or less, and the beam spot is formed by (i) a first optical system including an aspherical lens, or (ii) a second optical system including a condenser lens and a cylindrical lens configured so that the femtosecond laser light passes through the condenser lens prior to passing through the cylindrical lens.

2. The optical component manufacturing method according to claim 1, wherein the preparing includes injecting hydrogen into the glass member.

3. The optical component manufacturing method according to claim 1, wherein the light intensity distribution has a central region forming a part of the flat-top region, including a center of gravity of the beam irradiation region, and accounting for 50% of the area of the flat-top region, and the central region has a flatness such that a maximum light intensity and a minimum light intensity within the central region fall within a range of 55% or more and 145% or less of an average light intensity in the central region.

4. An optical component manufactured by the optical component manufacturing method according to claim 1, wherein in a cross-section of the glass member orthogonal to the scanning direction, the refractive index changing region includes no refractive index periodic structure in which a refractive index periodically fluctuates along an axis passing through the refractive index changing region.

5. The optical component according to claim 4, wherein the axis for checking the refractive index periodic structure is an axis that makes an angle from 0° to 10° with respect to a reference axis orthogonal to both the scanning direction and an irradiation direction in which the laser light is irradiated.

* * * * *